(12) United States Patent
Schilit (10) Patent No.: US 8,655,952 B1
(45) Date of Patent: Feb. 18, 2014

(54) AUTOMATING HELP TASKS ACROSS MULTIPLE DEVICES

(71) Applicant: Google Inc., Mountain View, CA (US)

(72) Inventor: William Noah Schilit, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/656,640

(22) Filed: Oct. 19, 2012

(51) Int. Cl.
*G06F 15/16* (2006.01)

(52) U.S. Cl.
USPC ............ 709/204; 709/205; 709/217; 709/203

(58) Field of Classification Search
USPC .......... 709/217–219, 203, 204–205, 223–224
See application file for complete search history.

(56) References Cited

U.S. PATENT DOCUMENTS

| | | | |
|---|---|---|---|
| 6,289,370 B1 | 9/2001 | Panarello et al. | |
| 6,300,950 B1 | 10/2001 | Clark et al. | |
| 6,584,496 B1 | 6/2003 | Ludtke | |
| 6,615,240 B1 | 9/2003 | Sullivan et al. | |
| 6,615,245 B1 | 9/2003 | McFall et al. | |
| 6,675,253 B1 | 1/2004 | Brinkmann, Jr. et al. | |
| 7,620,610 B2 | 11/2009 | Macbeth et al. | |
| 7,730,208 B2 * | 6/2010 | Saha et al. | 709/244 |
| 2001/0052088 A1 * | 12/2001 | Donhauser et al. | 714/38 |
| 2002/0006790 A1 * | 1/2002 | Blumenstock et al. | 455/423 |
| 2003/0191820 A1 * | 10/2003 | Ludtke | 709/219 |
| 2005/0078968 A1 | 4/2005 | Ohta | |
| 2006/0117315 A1 | 6/2006 | Bussert et al. | |
| 2009/0024872 A1 * | 1/2009 | Beverly | 714/25 |
| 2009/0285392 A1 * | 11/2009 | Leitheiser et al. | 380/255 |
| 2010/0146280 A1 * | 6/2010 | Teng et al. | 713/175 |
| 2011/0307780 A1 | 12/2011 | Harris et al. | |
| 2012/0208485 A1 * | 8/2012 | Kim | 455/404.1 |

* cited by examiner

*Primary Examiner* — Abdullahi Salad
(74) *Attorney, Agent, or Firm* — McDonnell Boehnen Hulbert & Berghoff LLP (57) ABSTRACT

A method and/or system for automating help task across multiple devices may include receiving from a requesting device a request for help instructions corresponding to a receiving electronic device, where the receiving device is not the requesting device. Help instructions may be sent to the requesting device in response to the request for help instructions. A request to automate the help instructions on the receiving device may be received from the requesting device. Automation data may be sent to the receiving device in response to the request to automate the help instructions. A determination may be made of whether the requesting device corresponds to a particular user. A determination of the receiving device may be made from a plurality of devices corresponding to the particular user. Automation status may be sent to the requesting device indicative of whether the help instructions were automated on the receiving device.

18 Claims, 5 Drawing Sheets

AUTOMATING HELP TASKS ACROSS MULTIPLE DEVICES

TECHNICAL FIELD

Aspects of the present application relate to communications. More specifically, certain implementations of the present disclosure relate to a method and/or system for automating help task across multiple devices.

BACKGROUND

As new electronic devices having new features emerge on the market, users of such electronic devices find themselves frequently seeking help with new features using a device different than the one employing the new features. Users are faced with a burdensome process of having to recreate the help steps they found using one device on the device for which they requested help.

Further limitations and disadvantages of conventional and traditional approaches will become apparent to one of skill in the art, through comparison of such approaches with some aspects of the present method and/or system set forth in the remainder of this disclosure with reference to the drawings.

BRIEF SUMMARY

Method and/or system for automating help tasks across multiple devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

The present disclosure relates to a method and/or system for automating help tasks across multiple devices. In various embodiments of the disclosure, a method and/or system for automating help tasks across multiple devices may include receiving from a requesting device a request for help instructions corresponding to a receiving electronic device, where the receiving device is not the requesting device. Help instructions may be sent to the requesting device in response to the request for help instructions. A request to automate the help instructions on the receiving device may be received from the requesting device. Automation data may be sent to the receiving device in response to the request to automate the help instructions.

A determination may be made of whether the requesting device corresponds to a particular user. When the requesting device corresponds to a particular user, a determination of the receiving device may be made from a plurality of devices corresponding to the particular user. When the requesting device does not correspond to a particular user, a request for addressing information of the receiving device may be sent to the requesting device.

Feedback data may be received from the receiving device. The feedback data may contain information on whether the receiving device successfully executed the automation data. Automation status information may be sent to the requesting device based on the feedback. The feedback data may contain information on whether the receiving device can execute the automation data. If the receiving device cannot automatically execute the automation data, instructions on how to enable the automation data to be executed automatically may be sent to the receiving device.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "block" refers to functions, processes, threads, etc. than can be performed by one or more circuits. As utilized herein, the term "e.g.," introduces a list of one or more non-limiting examples, instances, or illustrations. As utilized herein, the term "server" may refer to a plurality of machines, at least some of which may be installed in different locations, and each of which may be utilized to implement distinct and/or redundant functions associated with operations attributed to and/or performed by the server.

Figure 1:
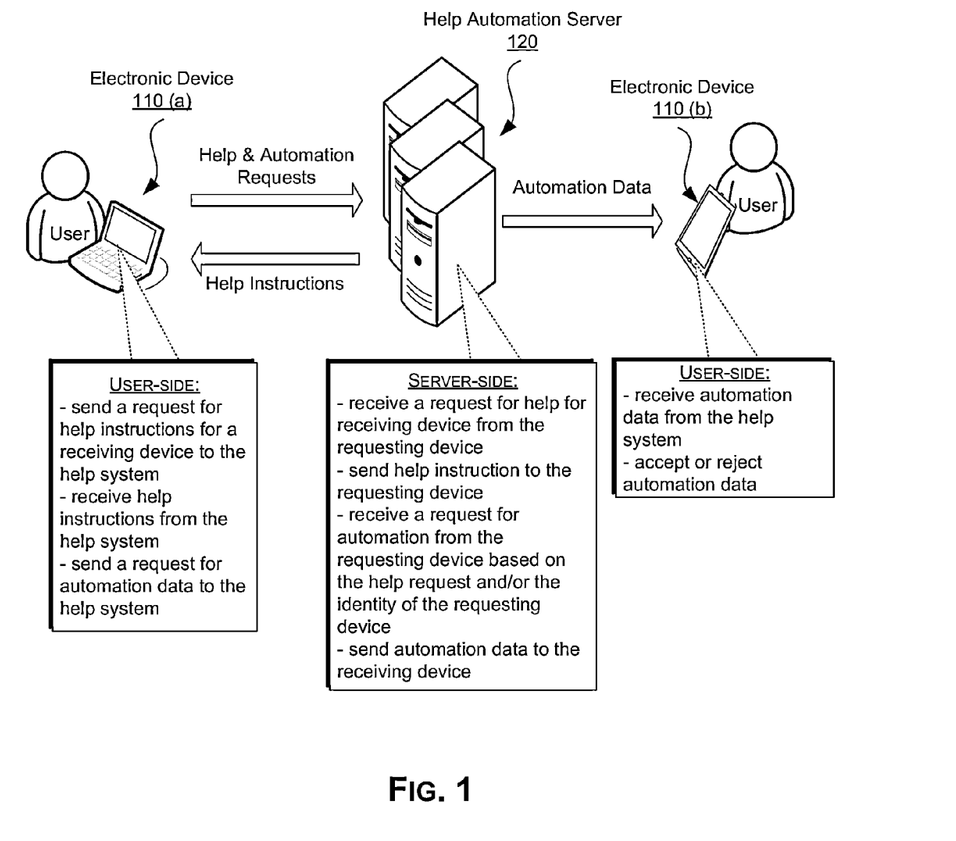
FIG. 1 is a block diagram of an example of a system for automating help tasks across multiple devices, in accordance with an embodiment of the disclosure.

FIG. 1 is a diagram illustrating an example of a system for automating help tasks across multiple devices, in accordance with an embodiment of the disclosure. Referring to FIG. 1, there is shown an electronic device 110(a), 110(b) and a help automation server 120.

The electronic device 110(a) and/or 110(b) may comprise suitable logic, circuitry, interfaces, and/or code that may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC). The electronic device 110(a) and/or 110(b) may be operable to process, generate, present and/or output data and/or messages. The electronic device 110(a) and/or 110(b) may be enabled to perform, run, and/or execute various functions, operations, applications and/or programs based on, for example, user instructions and/or interactions, and/or pre-configured instructions. For example, the electronic device 110(a) and/or 110(b) may be enabled to run a network browser or other applications for providing Internet services to a user of the electronic device 110(a) and/or 110(b). Electronic device 110(a) and/or 110(b) may comprise cellular phones, smartphones, tablets, laptop computers, desktop and/or personal computers, televisions, personal media players, and/or other similar devices which may communicate, process, generate, present and/or output data. The disclosure, and/or any implementation(s) in accordance therewith, however, are not limited to any particular type of electronic devices.

The help automation server 120 may comprise suitable logic, circuitry, interfaces, and/or code that may be operable to provide help automation services across multiple electronic devices. In this regard the help automation server may be operable to communicate data and/or messages via wired and/or wireless connections configured in accordance with one or more supported wireless and or wired protocols, standards and/or interfaces (e.g. Ethernet, Bluetooth, WiFi, cellular, WiMAX, WLAN, NFC) with electronic devices, such as, for example, the electronic device 101(a) and/or 110(b). The help automation server 120 may be enabled to process, store, manage and/or communicate data and/or messages relevant to performing various features on electronic devices, such as, for example, the electronic device 110(a) and/or 110(b). The help automation server may comprise a dedicated system and/or a general purpose system configured to provide help automation services across multiple electronic devices. The disclosure, and/or any implementation(s) in accordance therewith, however, are not limited to any particular type of a help automation server.

In operation, the electronic device 110(a) may receive from a user of the electronic device 110(b) a request for help instructions corresponding to a different electronic device, such as, for example, the electronic device 110(b). In this regard, the electronic device 110(a) may be operable to accept user input. For example, the user of the electronic device 110(a) may use a web browsing application installed on the electronic device 110(a) to run a search for help instructions corresponding to the electronic device 110(b). The electronic device 110(a) may receive the search from the user through the web browsing application and may send a request for help instructions to a help server, such as the help automation server 120 for example. The electronic device 110(a) may receive the help instructions from the help automation server 120 and may output the help instructions to the user in, for example, the web browsing application. The electronic device 110(a) may receive from the user a request to automate the help instructions on a different electronic device, such as, for example, the electronic device 110(b). In this regard, the electronic device 110(a) may send the request to automate the help instructions to a help server, such as the help automation server 120 for example. In an example embodiment of the disclosure, the electronic device 110(a) may receive from the help automation server 120 data indicative of whether the request to automate the help instructions was successfully processed by the help automation server 120 and/or whether automation data was sent by the help automation server 120 to a different device, such as, for example, the electronic device 110(b). In another example embodiment of the disclosure, the electronic device 110(a) may receive data from the help automation server 120 comprising automation instructions and/or data for automating the help task on the electronic device 110(b). In this regard, the electronic device 110(a) may send the automation data to the electronic device 110(b). The electronic device 110(a) may receive from the electronic device 110(b) data indicative of whether the automation data was successfully processed by the electronic device 110(b).

In operation, the electronic device 110(b) may receive from a help server, such as, for example, the help automation server 120, automation data. In response to receipt of the automation data, the electronic device 110(b) may automatically, for example, perform a function and/or adjust application and/or feature settings on the electronic device 110(b) without an intervention by a user of the electronic device 110(b). The electronic device 110(b) may provide a user with an option to automatically perform (partially or fully) the function, adjust the application and/or feature settings on the electronic device 110(b). The electronic device 110(b) may provide the user with the option to automatically and partially perform the function, adjust the application and/or feature settings by, for example, opening a particular function menu, application, application settings menu and/or the application. The electronic device 110(b) may provide the user with the option to automatically and fully perform the function, adjust the application and/or feature settings by, for example, performing the function, adjust the application and/or feature settings in a background. The electronic device 110(b) may communicate to the user a confirmation of a completion of such performance and/or adjustment. In this regard, the communication of the confirmation of a completion of such performance and/or adjustment may be visual, audible and/or sensory.

In operation, the help automation server 120 may receive from an electronic device, such as, for example, the electronic device 110(a), a request for help instructions corresponding to a different electronic device, such as, for example, the electronic device 110(b). The help automation server 120 may be operable to perform a search of a help instruction database based on the request for help instructions. In this regard, the help automation server 120 may process the request for help instructions to determine the type of the electronic device 110(b) and/or particular features for which help instructions were requested. Based on the determination of the type of the electronic device 110(b) and/or particular features for which help instructions were requested, the help automation server may retrieve from the help instructions database help instructions corresponding to the electronic device 110(b) and/or particular features thereof. The help automation server 120 may send to the electronic device 110(a) the help instructions corresponding to the electronic device 110(b).

The help automation server 120 may receive from the electronic device 110(a) a request to automate the help instructions corresponding to the electronic device 110(b). The help automation server 120 may be operable to perform a search of an automation data database based on the request to automate the help instructions corresponding to the electronic device 110(b), on the type of the electronic device 110(b) and/or the particular features for which help instructions were requested. The help automation server may retrieve from the automation data database automation data corresponding to the electronic device 110(b) and/or particular features of thereof. The help automation server 120 may send to the electronic device 110(b) the automation data corresponding to the electronic device 110(b). The help automation server 120 may send to the electronic device 110(a) data indicative of indicative of whether the request to automate the help instructions was successfully processed by the help automation server 120 and/or whether automation data was sent to the electronic device 110(b).

In another example embodiment of the disclosure, the help automation server 120 may send to the electronic device 110(a) the automation data corresponding to the electronic device 110(b). The electronic device 110(a) may send the automation data to the electronic device 110(b). The electronic device 110(b) may send to the electronic device 110(a) and/or the help automation server 120 data indicative of whether the automation data was successfully processed by the electronic device 110(b).

In an example embodiment of the disclosure, the help automation server 120 may provide and/or manage user registration and/or authentication services. In this regard, a user of an electronic device, such as, for example, the electronic device 110(a) and/or the electronic device 110(b), may register with the registration/authentication services provided by the help automation server 120, by for example creating a user account. The user may register one or more electronic devices under the user account, such as, for example, the electronic device 110(a) and the electronic device 110(b). The help automation server 120 may provide user authentication services. For example, the help automation server 120 may provide a prompt to the user to enter authentication information on the electronic device 110(a). The electronic device 110(a) may send the authentication information to the help automation server 120 for authenticating the user.

In an example embodiment of the disclosure, the help automation server 120 may automatically authenticate the user when the user through an electronic device, such as, for example, the electronic device 110(a) sends a request for help instructions corresponding to different electronic device, such as, for example, the electronic device 110(b). In this regard, when the help automation server 120 receives the request for help instructions it may verify the identity of the electronic device 110(a). The help automation server 120 may perform a search on a user registration database to determine whether the electronic device 110(a) corresponds to a particular user. In a case, where the electronic device 110(a) corresponds to a particular user, the help automation server 120 may determine electronic devices, other than the electronic device 110(a), that also corresponding to the particular user, such as for example, the electronic device 110(b).

In an example embodiment of the disclosure, when a particular user is registered with the services provided by the help automation server 120 and the particular user has one or more devices corresponding to the user account for the particular user, such as, for example, the electronic device 110(a) and the electronic device 101(b), when the help automation server 120 receives from the electronic device 110(a) a request for help instructions corresponding to an electronic device that is of the same or similar type as the electronic device 110(b), the help automation server 120 may determine that the request for help instruction corresponds to the electronic device 110(b). The help automation server 120 may send to the electronic device 110(a) the help instructions corresponding to the electronic device 110(b) and/or may data to the electronic device 110(a) that may suggest to a user of the electronic device 110(a) to automate the help instructions on the electronic device 110(b).

In an example embodiment of the disclosure, when a help automation server 120 does not receive from an electronic device, such as, for example, the electronic device 110(a), user authentication information and/or does not automatically determine the identity of an electronic device for which help instructions were requested, such as, for example, the electronic device 110(b), the help automation server may send a request to the electronic device 110(a) for addressing information of the electronic device 110(b).

In an example embodiment of the disclosure, the help automation server 120 may, in response to a request for automation of the help instructions on the on the electronic device 110(b), received from an electronic device, such as, for example, the electronic device 110(a), send automation data to the electronic device 110(a), through various delivery methods suitable for the electronic device 110(a). For example, the help automation server 120 may send a Uniform Resource Locator (URL) to the electronic device. In this regard, the help automation server may send the URL to, for example, a browser application on the electronic device 110(a). The disclosure, and/or any implementation(s) in accordance therewith, however, are not limited to any particular data delivery method of the automation data, and may include a text message, an e-mail, and/or any other suitable data delivery method. The electronic device 110(a) may receive the URL and open it in the browser application or it may redirect the URL to be opened and/or processed by a different application on the electronic device 110(a), for example a help automation application. The disclosure, and/or any implementation(s) in accordance therewith, however, are not limited to any particular application on the electronic device 110(a). The electronic device 110(a) may send the automation data (processed or un-processed), comprising, for example, the URL, to the electronic device 110(b).

In another example embodiment of the disclosure, the help automation server 120 may, in response to a request for automation of the help instructions received from an electronic device, such as, for example, the electronic device 110(a), send automation data to an electronic device, such as, for example, the electronic device 110(b), through various delivery methods suitable for the electronic device 110(b). For example, the help automation server 120 may send a Uniform Resource Locator (URL) to the electronic device. In this regard, the help automation server may send the URL to, for example, a browser application on the electronic device 110(b). The disclosure, and/or any implementation(s) in accordance therewith, however, are not limited to any particular data delivery method of the automation data, and may include a text message, an e-mail, and/or any other suitable data delivery method.

Whether the URL was received from the electronic device 110(a) and/or the help automation server 120, the electronic device 110(b) may receive and process the URL and open it in the browser application or it may redirect the URL to be opened and/or processed by a different application on the electronic device 110(b), for example a help automation application. The disclosure, and/or any implementation(s) in accordance therewith, however, are not limited to any particular application on the electronic device 110(b), and may include any application suitable for accepting and/or processing automation data.

Figure 2:
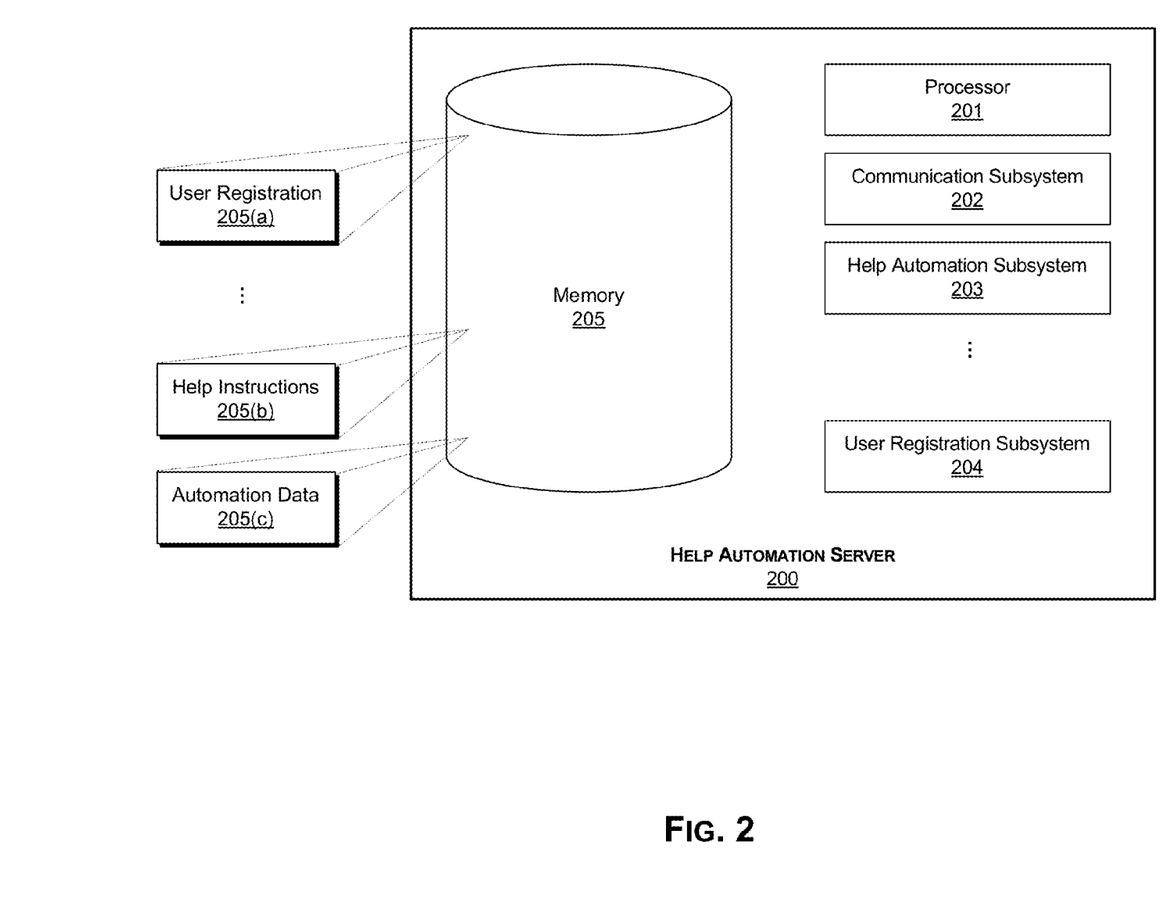
FIG. 2 is a block diagram of an example of a help automation server, in accordance with an embodiment of the disclosure.

FIG. 2 is a block diagram of an example of a help automation server, in accordance with an embodiment of the disclosure. Referring to FIG. 2 there is shown a help automation server 200. The help automation server 200 may comprise the help automation server 120, as depicted in, and/or described with respect to FIG. 1. The help automation server 200 may comprise a processor 201, a communication subsystem 202, a help automation subsystem 203, a user registration subsystem 204 and/or a memory 205.

The processor 201 may comprise suitable circuitry, interfaces, logic, and/or code that may be operable to support communication services, user registration and authentication services, and/or help automation services. The processor 201 may manage and control operation of the components of help automation server 200, such as, for example the communication subsystem 202, the help automation subsystem 203, the user registration subsystem 204 and/or the memory 205.

The communication subsystem 202 may comprise suitable circuitry, interfaces, logic, and/or code that may be operable to communicate data from and/or to the help automation system 200, such as via one or more wired and/or wireless connections. The communication subsystem 202 may be configured to support one or more wireless and/or wired protocols, standards and/or interfaces (e.g. Ethernet, Bluetooth, WiFi, cellular, WiMAX, WLAN, NFC, etc.). The communication subsystem 202 may support signal processing operations comprising filtering, amplification, analog-to-digital conversion and/or digital-to-analog conversion.

The help automation subsystem 203 may comprise suitable circuitry, interfaces, logic, and/or code that may be operable to receive and/or process requests for help instructions and/or requests to automate help instructions on electronic devices. In this regard, the help automation subsystem 203 may be operable to receive and/or process a request from an electronic device, such as the electronic device 110(a) for help instructions for a different electronic device, such as, for example, the electronic device 110(b). The help automation subsystem 203 may be operable to perform various data processing techniques to determine the type of the electronic device 110(b) and/or the specific feature of the electronic device 110(b) device. For example, the help automation subsystem 203 may be operable to initiate a search in a help instructions database, such as, for example, the help instructions database 205(b), to find help instructions corresponding to the type of the electronic device 110(b) and/or the specific feature of the electronic device 110(b) for which the help instructions were requested.

The help automation subsystem 203 may be operable process a request from an electronic device, such as, for example, the electronic device 110(a), to automate help instructions on a different electronic device, such as, for example, the electronic device 110(b). In this regard the help automation system 203 may be operable to initiate a search in an automation data database, such as, for example, the automation data database 205(c), to find help instructions corresponding to the type of the electronic device 110(b) and/or the specific feature of the electronic device 110(b) for which the request to automate the help instructions was received.

The user registration subsystem 204 may comprise suitable circuitry, interfaces, logic, and/or code that may be operable to communicate, process and/or manage user registration and/or authentication requests and/or device registration and/or authentication requests. In this regard, the user registration subsystem 204 may be operable to manage user accounts (e.g., create and/or store new user accounts, access, store, update, modify and/or mange existing user accounts), mange user devices (e.g., add, delete, modify, authorize, de-authorize and/or manage devices associated with a particular user account). The registration subsystem 204 may access, manage and/or process data in the user registration database, such as, for example, the user registration database 205(a). For example, upon receiving a request to create a new user account, the user registration subsystem 204 may create a data entity in the user registration database 205(a).

The memory 205 may comprise suitable circuitry, interfaces, logic, and/or code that may be operable to permanently and/or non-permanently store, buffer, and/or fetch data, code and/or other information, which may be used and/or processed. In this regard, the memory 205 may comprise, for example, read-only memory (ROM), random access memory (RAM), flash memory, solid-state drive (SSD), and/or field programmable gate array (FPGA) memory and/or other technology suitable for storing data, cod and/or other information. The memory 205 may be enabled to store executable instructions to manage and/or configure the processor 201, the communication subsystem 202, the help automation subsystem 203 and/or the user registration subsystem 204. In this regard, the memory 205 may store, for example, configuration data (e.g., parameters and/or code, comprising software and/or firmware), user data (e.g., registration information), help and automation data for a variety of electronic devices, such as for example the electronic device 110(a) and/or 110(b).

The memory 205 may comprise one or more databases such, as for example, a user registration database 205(a), a help instructions database 205(b), and/or an automation data database 205(c).

The user registration database 205(a) may comprise a plurality of entities, each corresponding to a particular user of a help automation system. In this regard each entity may comprise information and/or data, such as, for example, name, password, information about electronic devices associated with the user (e.g., type, brand, model, name, cellular number, serial number).

The help instructions database 205(b) may comprise a plurality of entities, each corresponding to a particular electronic device. In this regard each entity may comprise information and/or data, such as, for example, about the operation and/or features of the particular electronic device (e.g., a cellular phone, smartphone, tablet, laptop computer, desktop and/or personal computer, television, and/or personal media player). The help instructions database 205(b) may store step-by-step instructions on how to operate a particular feature on a particular electronic device.

The automation data database 205(c) may comprise a plurality of entities, each corresponding to automation data for a particular feature and/or function on a particular electronic device. In this regard each entity may comprise information and/or data that when sent to a particular electronic device will trigger operation of a particular feature and/or function on the electronic device. In this regard, the automation data database 205(b) may store automation data, such as, for example, a set of instructions that when executed on the electronic device will trigger the device to operate a particular feature and/or perform a particular function. The automation data may be associated with the help instructions stored in the help instructions database 205(b).

The components of the help automation server 200, such as, for example, the communication subsystem 202, the help automation subsystem 203, the user registration subsystem 204 and/or the memory 205, may be implemented in an integrated or a distributed system. An integrated system may be implemented, for example, on one computer, server, machine or device, where the integrated system may be configured to perform some or all of the functions, features and/or operations of the communication subsystem 202, the help automation subsystem 203, the user registration subsystem 204 and/or the memory 205 as described herein. A distributed system may be implemented with multiple components (e.g., computers, servers, machines and/or devices), where each of the multiple components may be configured to perform some or all of the functions, features and/or operations of the communication subsystem 202, the help automation subsystem 203, the user registration subsystem 204 and/or the memory 205 as described herein. Each function, feature and/or operation may be implemented on one or more of the components of the distributed system. For example, a specific feature, function and/or operation may be implemented only one component of the distributed system or it may be implemented across multiple components of the distributed system.

In operation, the help automation server 200 may be operable to receive from an electronic device, such as, for example, the electronic device 110(a), a request for help instructions corresponding to a different device, such as, for example, the electronic device 110(b). In this regard, the request for help instructions may be received and/or processed by a communication subsystem, such as for example, the communication subsystem 202. The communication subsystem 202 may send the received request (processor or unprocessed) to a help automation subsystem, such as, for example, the help automation subsystem 203. The help automation subsystem 203 may receive and/or process the request for help instructions. In this regard, the help automation subsystem may determine the type of the electronic device 110(b) and/or the features of the electronic device 110(b) for which the help instructions were requested. For example, the help automation subsystem 203 may use the determined type and/or features of the electronic device 110(b) to initiate a search in help instructions database, such as, for example, the help instructions database 205(b) to identify particular help instructions to be sent to the electronic device 110(a). The communication subsystem 202 may send the particular help instructions to the electronic device 110(a). The communication subsystem 202 may receive and/or process a request from the electronic device 110(a) to automate the help instructions on the electronic device 110(b). The communication subsystem 202 may send the received request (processed or unprocessed) to the help automation subsystem 203. The help automation subsystem 203 may receive and/or process the request to automate the help instructions. In this regard the help automation subsystem 203 may initiate a search of an automation data database, such as, for example, the automation data database 205(c) based on the determined type and/or features of the electronic device 110(b) and/or the particular help instructions sent to the electronic device 110(a) to determine particular automation data to be sent to the electronic device 110(b). The communication subsystem 202 may send the particular automation data to the electronic device 110(b). In another example embodiment of the disclosure, the communication subsystem 202 may send the particular automation data to the electronic device 110(a) along with instruction for the electronic device 110(a) for sending the automation data to the electronic device 110(b).

Figure 3A:
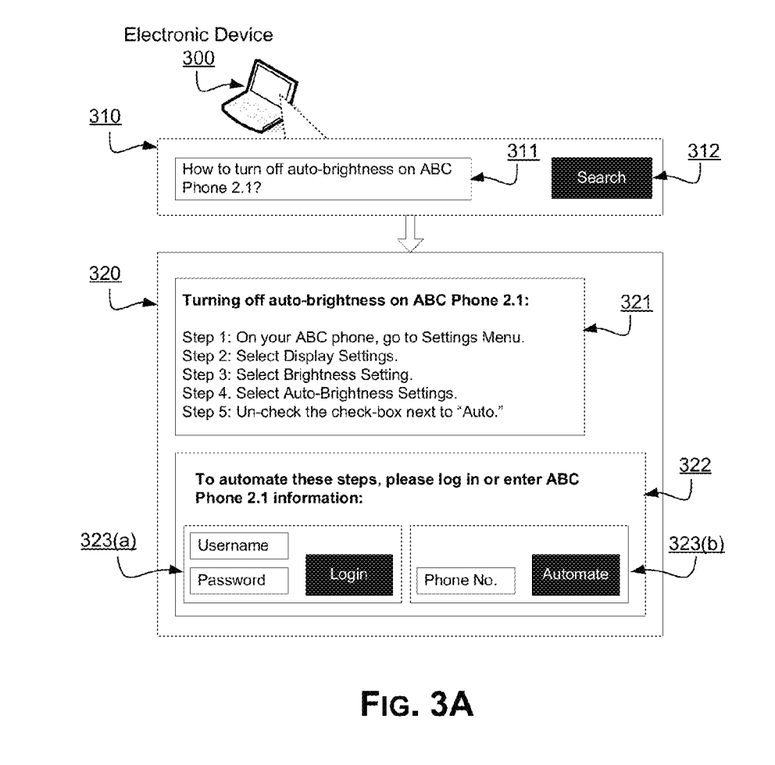
FIGS. 3A-3C are block diagrams of example user interactions with a system for automating help tasks across multiple devices on a requesting device, in accordance with an embodiment of the disclosure.
Figure 3B:
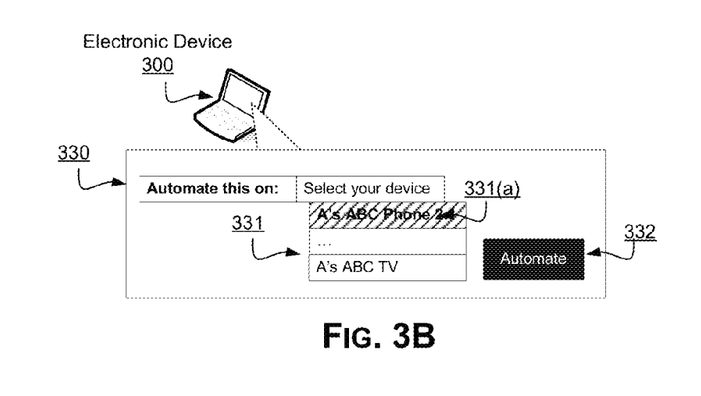
Figure 3C:
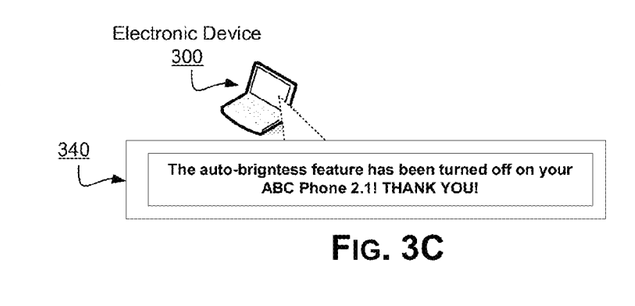

FIGS. 3A-3C are block diagrams of example user interactions with a system for automating help tasks across multiple devices on a requesting device, in accordance with an embodiment of the disclosure. Referring to FIGS. 3A-C, there is shown an electronic device 300, which may be operable to communicate with a help automation system, such as, for example, the help automation server 120 and/or 200. The electronic device may, for example, comprise the electronic device 110(a) as depicted in and described with respect to FIG. 1, for example. The electronic device 300 may be operable to display and/or present to a user of the electronic device 300 various information and/or data blocks, such as, for example, the information blocks 310, 320, 330, and 340. The disclosure, and/or any implementation(s) in accordance therewith, however, are not limited to any particular type of information and/or data blocks and/or the method by which such information and/or data blocks are presented to the user of the electronic device 300.

Referring to FIG. 3A, there is shown an example set of information and/or data blocks that may be presented to a user as the user interacts with the system for automating help tasks across multiple devices in accordance with the disclosure. The block 310 may comprise a search region 311 and a search button 312. The user of the electronic device may enter text in the search region 311. The user may send a request for help instructions by clicking, pushing and/or touching (depending on the input/output method supported by the electronic device) the search button 312. For example, a user may want to obtain help instructions on how to turn of auto-brightness on user's ABC phone 2.1, where the ABC phone 2.1 is not the same as the electronic device 300. In this regard, the user may input a question "how to turn-off auto-brightness on ABC Phone 2.1" into the search region 311 and submit the request for help instructions by selecting the search button 312. The disclosure, and/or any implementation(s) in accordance therewith, however, are not limited to any particular help instructions search method, and may include other search methods, such as for example, browsing through a list of available help instructions that may be organized by, for example, device, topic, and/or device feature. When the user sends the request for help instructions, the user may be presented with block 320.

The block 320 may comprise help instructions region 321 and/or help automation region 322. The help instruction region 321 may comprise the help instructions that the user requested by sending the request for help instructions, for example, as described with respect to block 310. The help instructions in the help instructions region 312, may guide the user through the steps that may be necessary to accomplish the task as specified by the user in the search region 311. The help automation region may comprise a login region 323(a) and an automation region 323(b). The user may submit login information such as a user name and a password by entering it in appropriate fields in the login region and by selecting the "Login" button in the login region 323(a). If the user selects the "Login" button in the login region 323(a), the user may be presented with a block 330 in FIG. 3B. The user may submit addressing information (e.g., phone number, e-mail) by entering it in appropriate field in the automation region 323(b) and by selecting the "Automate" button in the automation region 323(b). If the user selects the "Automate" button in the automate region 323(b), the user may be presented with block 340 in FIG. 3C.

Referring to FIG. 3B, there is shown an example set of information and/or data blocks that may be presented to a user as the user interacts with the system for automating help tasks across multiple devices in accordance with the disclosure. The block 330 may comprise a device selection region 331 and an automate button 332. The device selection region 331 may comprise a list of devices associated with a particular user (e.g., the user whose login and password was entered and submitted in the login region 323(a)). The user may select a device from the device selection region 331, such as the selected device 331(a). The list of devices in the list selection region 331 may be ordered by type of device, where devices more closely corresponding to the device for which the user requested help instructions in block 310 would appear first. The device selection region may comprise a list of devices that are capable of having a particular feature and/or function adjusted as specified by the user in the block 310, even if the devices are not of the type of the device as specified by the user in the block 310. In this regard, a particular user, for example, User A may request help instructions for turning off-auto-brightness on an ABC Phone 2.1 in block 310. A particular ABC Phone 2.1 (User A's ABC Phone 2.1) and a particular ABC TV (A's ABC TV) may be associated with User A. User A's ABC TV may also have an auto-brightness feature which may be capable of being turned-off. The list of devices in the device selection region may include User A's ABC Phone 2.1 listed as the first device and User A's ABC TV listed as the second device. User A may make a selection of the device on which User A wants to turn the auto-brightness off. For example, User A may select User A's ABC Phone (selected device 331(a)).

When the user makes a selection from the list of the devices in the list selection region 331, the user may submit a request to automate the help instructions on the selected device 331(a) by selecting the automate button 332. When the user select the automate button 332 the user may be presented with block 340.

Referring to FIG. 3B, there is shown an example set of information and/or data blocks that may be presented to a user as the user interacts with the system for automating help tasks across multiple devices in accordance with the disclosure. The block 340 may present to the user the status of user's request to automate help instructions on an electronic device, as submitted through automation region 323(b) or the automation block 330. For example, the user may be presented with information about whether the automation data was successfully sent to the electronic device of user's choice (as specified in the automation region 323(a) or in the device selection region 331).

Figure 4A:
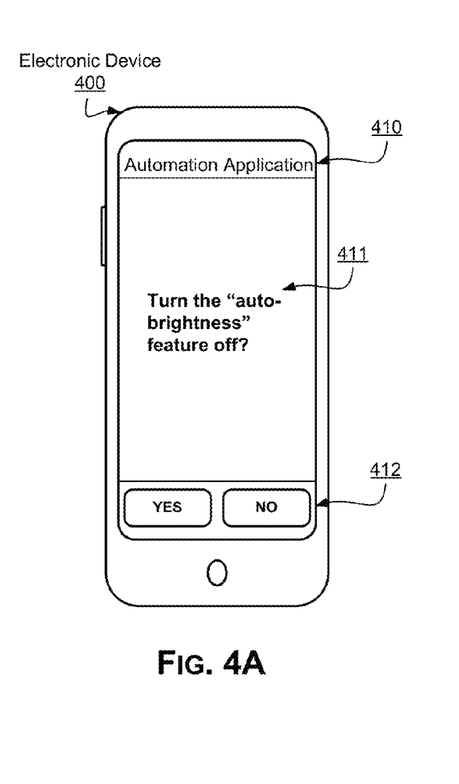
FIGS. 4A-4B are block diagrams of example user interactions with a system for automating help tasks across multiple devices on a receiving device, in accordance with an embodiment of the disclosure.
Figure 4B:
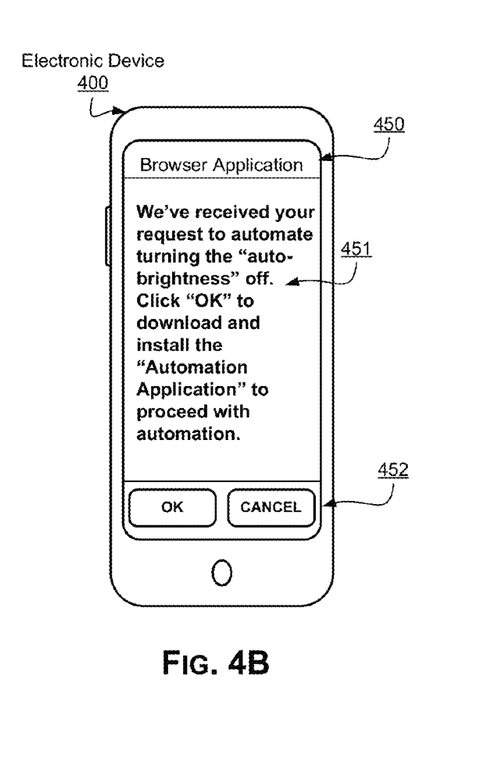

FIGS. 4A-4B are block diagrams of example user interactions with a system for automating help tasks across multiple devices on a receiving device, in accordance with an embodiment of the disclosure. Referring to FIGS. 4A-B, there is shown an electronic device 400, which may be operable to communicate with a help automation system, such as, for example the help automation server 120 and/or 200. The electronic device may, for example, comprise the electronic device 110(b) as depicted in and described with respect to FIG. 1, for example. The electronic device 400 may be operable to run various applications that may be operable to accept input from a user and/or present to a user information and/or data. The disclosure, and/or any implementation(s) in accordance therewith, however, are not limited to any particular applications running on the electronic device 400 or any type of method by which information and/or data is presented to the user of the electronic device 400.

Referring to FIGS. 4A-B, the electronic device 400 may comprise an application region, such as, for example, the application region 410 and/or 450. The application region 410 in FIG. 4A may comprise an information region, such as, for example the information region 411 and/or a decision region, such as the decision region 412. The application region 450 in FIG. 4B may comprise an information region, such as, for example the information region 451 and/or a decision region, such as the decision region 452.

When a request to automate help instructions on the electronic device 400 is received from an electronic device such as, for example, the electronic device 110(a) and/or 300, by a help automation system, such as, for example, the help automation server 120 and/or 200, the help automation server 120 and/or 200 may send automation data to the electronic device 400 according to the present disclosure. When the electronic device 400 receives the automation data, a user of the electronic device 400 may be presented with, for example, the application region 410 or 450.

Referring to FIG. 4A, in an example embodiment of the disclosure, when the electronic device 400 has a help automation application pre-installed on it at the time the automation data is received by the electronic device 400, the user of the electronic device 400 may be presented with the application region 410. The information region 411 may contain information and/or data that may convey to the user that the electronic device 400 has received automation data to perform a particular feature, function and/or operation. The user may be presented with a decision region 412 to either accept the automation data or reject it. If the user accepts the automation data, by for example, selecting a "Yes" button, the particular feature, function and/or operation may be automatically performed on the electronic device 400. In another example embodiment of the disclosure, the particular feature, function and/or operation may be performed automatically on the electronic device 400 (through the automation data) without displaying to the user a decision region 412. In this regard, the information region 411 may contain information and/or data that may convey to the user that the particular feature, function and/or operation has been performed (not shown). If the user does not accepts the automation data, by for example, selecting a "No" button, the particular feature, function and/or operation may not be performed on the electronic device 400.

Referring to FIG. 4B, in an example embodiment of the disclosure, when the electronic device 400 does not have a help automation application pre-installed on it at the time the automation data is received by the electronic device 400, the user of the electronic device 400 may be presented with the application region 450. The information region 451 may contain information and/or data that may convey to the user that the electronic device 400 has received automation data to perform a particular feature, function and/or operation and/or that the user may download, purchase and/or run (e.g., from a web browser) a help automation application that may be operable to complete the automation of a particular feature, function and/or operation on the electronic device 400. The user may be presented with a decision region 452 to, for example, accept (e.g., download, purchase, and/or run) the help automation application or reject it. If the user accepts the help automation application, by for example, selecting an "OK" button, the user may be prompted to complete steps necessary to accept the help automation application, for example, download, purchase, and/or run the help automation application (not shown). In this regard, after performing steps necessary to accept the help automation application, the user may be presented with the application region of the help automation application, such as for example, the application region 410 in FIG. 4A, which may be operational as described with respect to FIG. 4A for example. If the user does not accept the help automation application, by for example, selecting a "Cancel" button, the user may not be prompted to complete steps necessary to accept the help automation application.

Figure 5:
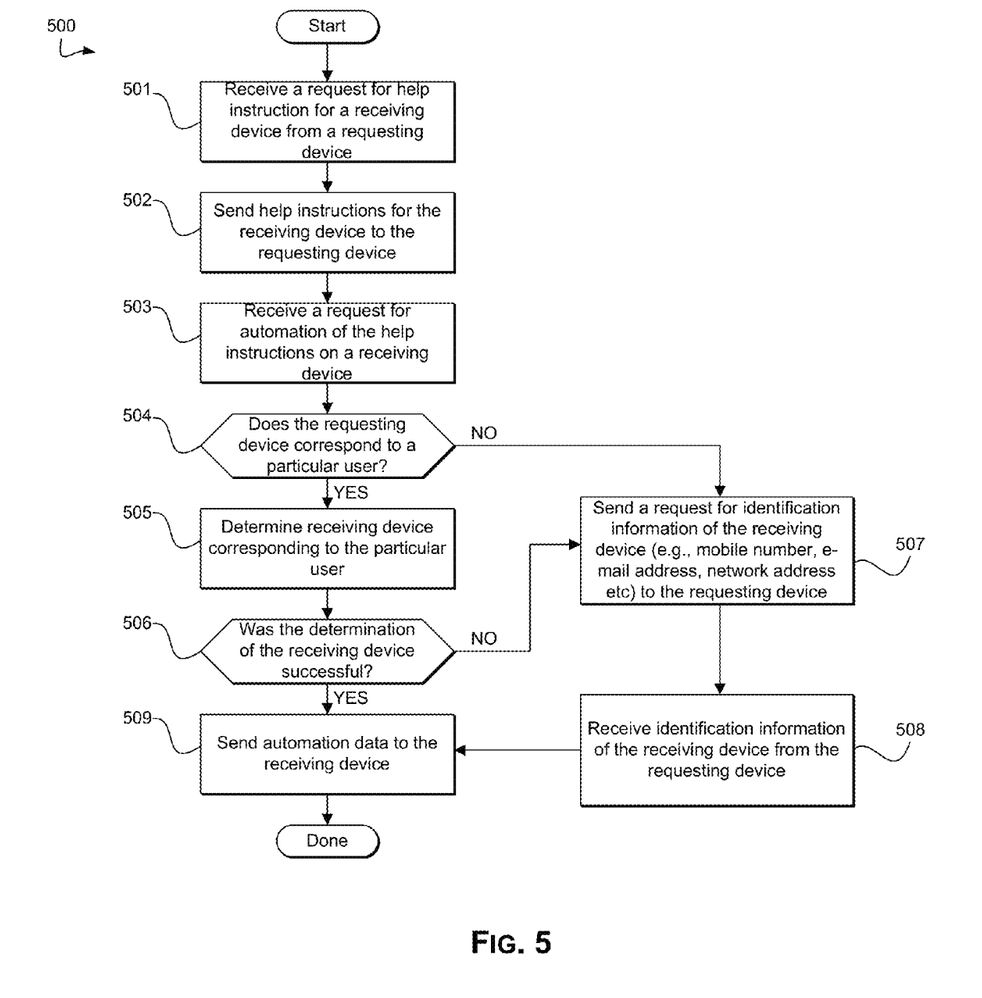
FIG. 5 is a flow chart illustrating example steps of a method for automating help tasks across multiple devices, in accordance with an embodiment of the disclosure.

FIG. 5 is a flow chart illustrating example steps of a method for automating help tasks across multiple devices, in accordance with an embodiment of the disclosure. Referring to FIG. 5, an example method 500 is shown comprising a plurality of example steps for automating help tasks across multiple devices.

In example step 501, a request for help instructions for a receiving device, such as, for example, the electronic device 110(b) may be received from a requesting device such as, for example, the electronic device 110(a). In an example embodiment of the disclosure, the request for help instructions may be initiated by a user of the requesting device in an internet browser when the user types in a question about the receiving device as described with respect to and/or depicted in FIG. 3A. The user may submit the question by, for example, clicking a "Search" button in the browser, pressing "Enter" on a keyboard or by performing any other action that would trigger the submission of the question. The question may then be received as a help request by a help automation system, such as for example, the help automation server 120 and/or 200. In this regard, the help automation system may determine the type of the receiving device and/or the specific feature of the receiving device for which the help instructions were requested. In this regard, the help automation system may use various text processing techniques, such as, for example, string partitioning and matching to determine the portions of the help request that correspond to the type of the receiving device and/or the specific features of the receiving device. The help automation system may initiate a search in a help instructions database, such as, for example, the help instructions database 205(b), to find help instructions corresponding to the type of the receiving device and/or the specific feature of the receiving device for which the help instructions were requested.

In example step 502, upon finding the corresponding help instructions, the help automation system may send the corresponding help instructions to the requesting device. In this regard, the help automation system may utilize the same method of communication with the requesting device as the method by which the help request was received from the requesting device. For example, if the help automation system received the help request from the requesting device through an internet browser opened in the requesting device, the help automation system may send the help instructions to the same internet browser, as described with respect to and/or depicted in FIG. 3A for example. The method of sending the help instructions may not be limited to the method by which the help request was received from the requesting device and may include any other acceptable methods of sending help instructions to an electronic device, such, as, for example, a text message or an e-mail. In an example embodiment of the disclosure, an alternative method of sending the help instruction to the requesting device may be specified by a user at the time the user submits a help request on the requesting device.

In example step 503, the help automation system may receive a request from the requesting device to automate the help instructions on the receiving device. In an example embodiment of the disclosure, the request to automate the help instructions may be initiated by a user of the requesting device in an internet browser when the user submits the request to automate the help instructions in a web browser by, for example, clicking an "Automate" button as described with respect to and/or depicted in FIG. 3A and/or FIG. 3B for example. The request for automation may then be received by a help automation system, such as for example, the help automation server 120 and/or 200. The help automation system may then initiate a search to find corresponding automation data in an automation data database, such as, for example, the automation data database 205(*c*) based on the corresponding help instructions, as determined in example step 502.

In example step 504, a determination by the help automation system may be made as to whether the requesting device corresponds to a particular user. In this regard, a user registration system, such as, for example, the user registration subsystem 204, may initiate a search in a user registration database, such, as for example the user registration database 205(*a*), to determine whether the requesting device corresponds to a particular user in the user registration database. The determination may be based upon a variety of information, for example, the identity of the requesting device (e.g., phone number, e-mail address, internet browser address, IP address), and/or user submitted information, such as, for example, a login and/or password submitted by the user prior to sending the request to automate the help instructions.

If the requesting device corresponds to a particular user, then the example steps continue at example step 505. In example step 505, a determination by the help automation system may be made as to whether the receiving device corresponds to the same particular user as the requesting device based on the determination in example step 504. In this regard, a user registration system, such as, for example, the user registration subsystem 204, may initiate a search in a user registration database, such, as for example the user registration database 205(*a*), to determine whether the user to whom the requesting device corresponds, has other than the receiving device corresponding to it. In this regard, if for example, it was determined in example step 504 that the requesting device corresponds to User A, then a search on the user registration database may be performed to determine other devices that also correspond to User A. A determination may be whether one of the devices corresponding to User A, other than the requesting device, may be the receiving device based on the request for help, the request for automation, and/or information corresponding to User A. In this regard, if one of User A's devices, is for example, a phone type B, and the request for help was directed to a phone type B, then the help automation system may determine that User A's phone B is the receiving device to which automation data may be sent.

In example step 506, a determination by the help automation system may be made as to whether a determination of the receiving device from example step 505 was successful. In this regard if at least one of the devices corresponding to a particular user is of the type of the receiving device as determined in step 501, then the determination of example step 505 is determined to be successful. If the determination of the receiving device was successful, the example steps continue at example step 509.

If the requesting device does not correspond to a particular user and/or the determination of the receiving device was not successful, then the example steps continue at example step 507. In example step 507, the help automation system may send to the requesting device a request for identification information of the receiving device. In an example embodiment of the disclosure, the help automation system may send the request for identification information using the same method of communication with the requesting device as the method by which the help request was received from the requesting device. For example, if the help automation system received the help request from the requesting device through an internet browser opened in the requesting device, the help automation system may send the help instructions to the same internet browser, as described with respect to and/or depicted in FIG. 3A for example. The method of sending the request for identification information may not be limited to the method by which the help request was received from the requesting device and may include any other acceptable methods of sending help instructions to an electronic device, such, as, for example, a text message or an e-mail. In an example embodiment of the disclosure, an alternative method of sending the request for identification information to the requesting device may be specified by a user at the time the user submits a help request on the requesting device.

In example step 508, the help automation system may receive identification information of the receiving device from the requesting device. In this regard, the type of identification information may include a phone number, an e-mail address, an internet address and/or any other type of identification information suitable to identify an electronic device. The identification information received from the requesting device may be used by the help automation system to send automation data as described with respect to example step 509.

In example step 509, the help automation system may send automation data to the receiving device. The help automation system may initiate a search in an automation data database, such as, for example, the automation data database 205(*c*), to find automation data corresponding to the type of the receiving device and/or the specific feature of the receiving device for which the help instructions were requested, as determined in example step 501. To send the corresponding automation data to the receiving device, the help automation system may utilize the identification information of the receiving device as determined in example step 505 and/or the identification information of the receiving device as received from the requesting device in example step 508.

Other implementations may provide a computer readable medium and/or storage medium, and/or a machine readable medium and/or storage medium, having stored thereon, a machine code and/or a computer program having at least one code section executable by a machine and/or a computer, thereby causing the machine and/or computer to perform the steps as described herein for automating help tasks across multiple devices.

Accordingly, the present method and/or system may be realized in hardware, software, or a combination of hardware and software. The present method and/or system may be realized in a centralized fashion in at least one computing system, or in a distributed fashion where different elements are spread across several interconnected computing systems. Any kind of computing system or other system adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:
    performing by one or more servers,
        receiving a request for help instructions for a first electronic device, wherein the request for help instructions is received from a second electronic device;
        sending help instructions to the second electronic device in response to the request for help instructions;
        determining whether the second electronic device corresponds to a particular user;
        based on the second electronic device corresponding to the particular user, determining a plurality of electronic devices that correspond to the particular user and determining the first electronic device from the plurality of electronic devices based on the request for help instructions, wherein the first electronic device is not the second electronic device;
        receiving a request for automation data from the second electronic device to perform the help instructions on the first electronic device; and
        sending the automation data to the first electronic device in response to the request for automation data.

2. The method according to claim 1, comprising:
    sending a request to the second electronic device for addressing information of the first electronic device; and
    receiving the addressing information of the first electronic device from the second electronic device.

3. The method according to claim 1, comprising receiving feedback data from the first electronic device.

4. The method according to claim 3, comprising sending automation status data to the second electronic device based on the feedback data.

5. The method according to claim 3, comprising determining whether the automation data can be automatically executed on the first device based on the feedback data.

6. The method according to claim 5, comprising sending to the first electronic device instruction for enabling the automation data to be automatically executed on the first device.

7. A method, comprising:
    performing by one or more servers,
        receiving a request for help instructions for a first electronic device, wherein the request for help instructions is received from a second electronic device, and wherein the second electronic device corresponds to a particular user;
        sending help instructions to the second electronic device in response to the request for help instructions;
        determining a plurality of electronic devices that correspond to the particular user;
        determining one or more compatible electronic devices from the plurality of electronic devices that correspond to the particular user, wherein the compatible electronic devices are operable to receive automation data;
        receiving a request for automation data from the second electronic device to perform the help instructions on a target electronic device, wherein the target electronic device is one of the one of more of the compatible electronic devices; and
        sending the automation data to the target electronic device.

8. The method according to claim 7, wherein the target electronic device is of the same type as type of the first electronic device.

9. The method according to claim 7, wherein the target electronic device is not of the same type as type of the first electronic device.

10. A system comprising:
    one or more processors, the one or more processors being operable to:
        receive a request for help instructions for a first electronic device, wherein the request for help instructions is received from a second electronic device;
        send help instructions to the second electronic device in response to the request for help instructions;
        determine whether the second electronic device corresponds to a particular user;
        based on the second electronic device corresponding to the particular user, determine a plurality of electronic devices that correspond to the particular user and determine the first electronic device from the plurality of electronic devices based on the request for help instructions, wherein the first electronic device is not the second electronic device;
        receive a request for automation data from the second electronic device to perform the help instructions on the first electronic device; and send the automation data to the first electronic device in response to the request for automation data.

11. The system according to claim 10, wherein the one or more processors is operable to:
send a request to the second electronic device for addressing information of the first electronic device; and
receive the addressing information of the first electronic device from the second electronic device.

12. The system according to claim 10, wherein the one or more processors is operable to receive feedback data from the first electronic device.

13. The system according to claim 12, wherein the one or more processors is operable to send automation status data to the second electronic device based on the feedback data.

14. The system according to claim 12, wherein the one or more processors is operable to determine whether the automation data can be automatically executed on the first device based on the feedback data.

15. The system according to claim 14, wherein the one or more processors is operable to send to the first electronic device instruction for enabling the automation data to be automatically executed on the first device.

16. A system comprising:
one or more processors, the one or more processor operable to:
receive a request for help instructions for a first electronic device, wherein the request for help instructions is received from a second electronic device, and wherein the second electronic device corresponds to a particular user;
send help instructions to the second electronic device in response to the request for help instructions;
determine a plurality of electronic devices that correspond to the particular user;
determine one or more compatible electronic devices from the plurality of electronic devices that correspond to the particular user, wherein the compatible electronic devices are operable to receive automation data;
receive a request for automation data from the second electronic device to perform the help instructions on a target electronic device, wherein the target electronic device is one of the one of more of the compatible electronic devices; and
send the automation data to the target electronic device.

17. The system according to claim 16, wherein the target electronic device is of the same type as type of the first electronic device.

18. The system according to claim 16, wherein the target electronic device is not of the same type as type of the first electronic device.

* * * * *